(12) United States Patent  
Van Drie

(10) Patent No.: US 7,083,324 B2
(45) Date of Patent: *Aug. 1, 2006

(54) INTEGRATED FIXED FILM ACTIVATED SLUDGE SYSTEM USING GRAVITY ASSISTED MIXING

(76) Inventor: Gerhardt Van Drie, 724 W. Pine Ave., El Segundo, CA (US) 90245

( * ) Notice: Subject to any disclaimer, the term of this patent is extended or adjusted under 35 U.S.C. 154(b) by 0 days.

This patent is subject to a terminal disclaimer.

(21) Appl. No.: 11/058,455

(22) Filed: Feb. 14, 2005

(65) Prior Publication Data

US 2005/0201202 A1 Sep. 15, 2005

Related U.S. Application Data

(63) Continuation-in-part of application No. 10/659,798, filed on Sep. 10, 2003, now Pat. No. 6,926,437.

(60) Provisional application No. 60/544,715, filed on Feb. 14, 2004.

(51) Int. Cl.
*B01F 11/00* (2006.01)
*C02F 3/08* (2006.01)

(52) U.S. Cl. .................. 366/335; 210/150; 210/615

(58) Field of Classification Search ........ 366/261–262, 366/268, 276–278, 332–335; 210/150–151, 210/615

See application file for complete search history.

(56) References Cited

U.S. PATENT DOCUMENTS

| 8,540 | A | * | 11/1851 | Kniffin | |
|---|---|---|---|---|---|
| 471,109 | A | * | 3/1892 | Eggleston | |
| 2,326,484 | A | * | 8/1943 | Moreton | 210/329 |
| 2,422,656 | A | * | 6/1947 | Carter, Jr. | 210/513 |
| 2,499,816 | A | * | 3/1950 | Carter, Jr. | 210/513 |
| 2,715,099 | A | | 8/1955 | Stuart | |
| 3,015,476 | A | * | 1/1962 | Stuart | |
| 3,434,699 | A | * | 3/1969 | Stuart | 366/137 |
| 3,664,647 | A | | 5/1972 | Snow | |
| 3,685,810 | A | * | 8/1972 | Calcote | |
| 3,788,616 | A | | 1/1974 | Clough | |

(Continued)

FOREIGN PATENT DOCUMENTS

WO 97/04859 A1 * 2/1997

(Continued)

*Primary Examiner*—Charles E. Cooley
(74) *Attorney, Agent, or Firm*—Gene Scott & Patent Law & Venture Group

(57) ABSTRACT

A beam is pivotally supported at a fixed pivot support, the beam movable in cyclic tilting motion such that ends of the beam move vertically in mutually opposing directions. The ends of the beam are pivotally engaged with vertical arms extending downwardly. The arms terminate with mixing plates immersed within the fluid so that the mixing plates cause fluid mixing as the tilts. A fixed film biomass is engaged with the surfaces of the plates for improved bioprocessing within the tanks.

5 Claims, 3 Drawing Sheets

U.S. PATENT DOCUMENTS

| | | | | |
|---|---|---|---|---|
| 3,837,492 | A * | 9/1974 | Di Bello | 210/150 |
| 4,035,290 | A * | 7/1977 | Torpey | 210/619 |
| 4,126,545 | A * | 11/1978 | Hagiwara | 210/619 |
| 4,177,147 | A * | 12/1979 | Roberts | 210/151 |
| 4,195,981 | A * | 4/1980 | Penberthy | |
| 4,211,647 | A * | 7/1980 | Friedman et al. | 210/603 |
| 4,269,719 | A * | 5/1981 | Yamamoto | 210/803 |
| 4,345,997 | A * | 8/1982 | McConnell et al. | 210/150 |
| 4,549,962 | A * | 10/1985 | Koelsch | 210/150 |
| 5,762,418 | A | 6/1998 | VanDrie | |
| 6,029,955 | A * | 2/2000 | Drie | |
| 6,036,357 | A * | 3/2000 | Van Drie | 366/332 |
| 6,322,056 | B1 * | 11/2001 | Drie | |
| 6,926,437 | B1 * | 8/2005 | Drie | 366/335 |

FOREIGN PATENT DOCUMENTS

| | | | |
|---|---|---|---|
| WO | 99/42205 A1 * | 8/1999 | |
| WO | 00/71236 A1 * | 11/2000 | |

* cited by examiner

INTEGRATED FIXED FILM ACTIVATED SLUDGE SYSTEM USING GRAVITY ASSISTED MIXING

RELATED APPLICATIONS

This application is a Continuation In Part Application of a prior filed application having Ser. No. 10/659,798 and filing date of Sep. 10, 2003 and entitled: "Gravity Powered Mixer System" which on Aug. 9, 2005 issued as U.S. Pat. No. 6,926,437, and this application also claims an earlier filing date for improvements thereto described in Provisional Application Ser. 60/544,715 having a filing date of Feb. 14, 2004.

BACKGROUND OF THE INVENTION

1. Field of the Invention

This invention relates generally to large-scale water treatment mixing apparatus' and more particularly to such apparatus' wherein the fluids being treated are mixed by a gravity assist system using a pivoted balanced beam and particularly where a fixed film media is used to improve process effectiveness and reduce cost.

2. Description of Related Art

The following art defines the present state of this field and each disclosure is hereby incorporated herein by reference:

Rose et al., U.S. Pat. No. 2,784,150 describes a vacuum still capable of equilibrium evaporation with no bumping comprising a still pot having two necks, one of said necks being connected to a longitudinally extended tube closed at its far end, the second of said necks being connected to condensing means; the first of said necks and its attached tube having extending therein an agitator comprising an elongated shaft having disposed along its midsection in a spaced relationship a plurality of inverted cup-shaped baffles, each baffle having a plurality of perforation spacedly disposed over its surface, said shaft passing through the center of, and being rigidly attached to, each baffle, said shaft further having attached to its lower end an open-spiral elastic spring and to its upper end a totally enclosed chamber containing a soft iron core; the aforementioned tube attached to the first neck being surrounded near its upper end by a solenoid capable of imparting a vertically reciprocating motion to the enclosed agitator when said solenoid is cyclically activated and deactivated by passage of electric current therethrough.

Clough, Jr., U.S. Pat. No. 3,788,616, teaches a "system for simultaneously aerating and agitating a body of liquid. The system comprises a body that is pivotally mounted in the liquid with its pivot point located intermediate its ends, and means for feeding air to the lower side of the body. The body is adapted to trap alternately at each end sufficient air to cause that end to rise in the liquid, and means are provided for releasing the air trapped at each end of the body when that end has risen a predetermined amount, with the result that the body oscillates on its pivot axis in see-saw fashion".

Cruickshank et al., U.S. Pat. No. 3,773,015 describes valve arrangement used to control the release of air from the helmet of a miniature diver so as to cause the diver to periodically dive and ascend within an aquarium tank. The cycle period can be varied by controlling the rate at which air is supplied from a conventional aquarium air source. The diver is slidably mounted on a hollow tube for movement between first and second stations. At the first station, the tube has an opening to admit air to the interior of the diver to increase its buoyancy. The admitted air is retained in the diver until it reaches the second station. The tube has a necked down portion at the second station to release the air contained within the diver.

Everett, U.S. Pat. No. 4,363,212, teaches a "buoyancy prime mover that converts the potential energy of a gas buoyant within a liquid into rotating mechanical energy comprises a plurality of rigid or collapsible buckets joined by one or more chains with rotatable sprockets and shafts to form a continuous loop so that when the buoyant gas is trapped within the buckets, the buckets rise through the liquid and rotate the chain and sprockets to generate power".

Parks, U.S. Pat. No. 4,595,296, teaches an invention which "relates to a mixing and blending system in which pulsed air or gas bubbles of predetermined variable size and frequency are injected into a tank containing materials to be agitated or stirred for mixing or blending. The air introduced at the bottom of the tank through an air inlet opening. There may be more than one air inlet and the inlets may be provided with accumulator plates depending upon diameter and height of the tank in which the mixing and blending is taking place. The inlets are located so as to create circular torroidal flow of fluid in a generally vertical plane. The accumulator plate has the purpose of assisting the formation of essentially a single bubble from the compressed air charge made to the air inlet and increasing the time required for the bubble to rise through the liquid by causing it to be formed more quickly and closer to the bottom of the tank. Hence, the accumulator plate is utilized in low viscosity liquids such as water".

Offermann, U.S. Pat. No. 4,737,036 describes a device for shipping cream or egg whites having a cup-shaped cylindrical housing with a performed bottom, a cap releasably locking the open top, a perforated plunger piston connected to one end of the piston rod and movable within the housing, the piston rod being movable through the cap and formed with a handle at its opposite end, one of two perforated plates spaced from the plunger piston on the piston rod. The perforated disc is biased by a spiral coil spring from the plunger and may be further biased from a second perforated disc. When the discs and plunger are compressed together, any product between them is squeezed out through their holes.

Hjort, et al, U.S. Pat. No. 4,779,990, teaches an "impeller apparatus for dispersing a gas into a liquid in a vessel includes a centrifugal flow turbine, the blades of which are formed with a substantially streamlined trailing surface terminated by a sharply pronounced spine. The blade is formed by a plate-like initial blank being cut to a shape having a central line of symmetry, the blank then being folded along the straight line of symmetry.

Litz, et al, U.S. Pat. No. 4,919,849, teaches a "gas-liquid mixing process and apparatus having a vessel with an axial flow down-pumping impeller in a draft tube has gas ingestion tubes extending into a body of liquid from a hollow portion of the impeller shaft or other fluid communication means with the overhead gas in the vessel. Upon gas-liquid mixing at liquid levels that interfere with vortex development by the impeller, gas is drawn from the overhead through the ingestion tubes into the body of liquid".

Small, U.S. Pat. No. 5,156,788, teaches a "device for use in the mixing of fluids, e.g. the gasification of liquids, comprises an elongate member including an internal passage; and, mounted on the elongate member via radial arms, one or more venturi members each having a convergent-divergent duct whose axis is substantially tangential to the elongate member, and in which the neck of the duct has an opening in communication, via passages in the radial, with the internal passage. On rotation of the device, reduced pressure in the duct neck draws fluid down the shaft of the elongate member".

Middleton, et al, U.S. Pat. No. 5,198,156, teaches a turbine agitator assembly including a reservoir for liquid, a rotor mounted in the reservoir and with a plurality of radially extending blades, and sparger means for introducing a fluid into liquid in the reservoir. The fluid sparger means and the rotor are so constructed and arranged that, in use, the rotor blades (submerged in the liquid) and/or the liquid flow they generate disperse the sparged fluid. Each of the blades is hollow and has a discontinuous leading edge, only a single trailing edge along an acute angle, no external concave surface and an open radially outer end.

Stavropol Agric Ins, SU 1400651 describes a mixer comprising a cavity with a conical bottom equipped with a heater and mixing device. The latter is made in the form of a bell positioned in the cavity. The bell is equipped in the upper part with a by-pass valve, connected to the rod, whose length is greater than the bell height by a distance equal to total of the cone bottom height and valve slide valve run. A rigid net partition, separating the cavity from the gas carrier, is attached to the cavity cover. The bell floats up due to the buoyancy force, which occurs when the biogas accumulates under it. The valve strikes the partition and opens. When the biogas leaves from under the bell, it drowns and valve closes with the help of rod. Mixer is used for mixing liquid media applied in aerobic fermentation of livestock farming wastes. Its structure is simplified and power losses are decreased.

Our prior art search with abstracts described above teaches the use of large industrial grade mixers for processing biomass sludge. However, the prior art fails to teach mixers of the types described herein and also do not suggest or teach the use of fixed film media engaged with such mixers for improved process efficiency and lower cost of processing. The present invention fulfills these needs and provides further related advantages as described in the following summary.

SUMMARY OF THE INVENTION

Integrated Fixed Film Activated Sludge Systems (IFAS) add the benefits of Fixed Film systems into the suspended growth Activated Sludge process. Activated Sludge has process flexibility and provides a high degree of treatment. Fixed Film processes are inherently stable and resistant to organic and hydraulic shock loadings. Placing Fixed Film media into Activated Sludge basins combines the advantages of both of these systems.

The additional biomass provided by placing Fixed Film media directly into the suspended growth reactor does not increase clarifier solids loading (a factor that often limits the treatment capacity of existing Activated Sludge systems).

IFAS technology addresses the need for increasing Activated Sludge plant capacity, with little or no added tankage, because of the additional fixed biomass. The fixed biomass also contributes to the ability of the process to respond to organic or hydraulic shock loads and to recover from upsets.

There are several types of media used to fix the biomass in the Activated Sludge basin. They include "Dispersed Media" entrapped in the aeration basin, and "Fixed Media," such as structured sheet media or knitted fabric media, that is placed in the aeration basin.

All IFAS systems require adequate preliminary treatment design and operation. Primary clarification or fine screening avoids ragging and material build-up on the media in the aeration basin and clogging of the dispersed media and retaining screens. Proper mixing is required for solids suspension, substrate transfer, and oxygen diffusion. The present invention provides this mixing. The mixing should not be too vigorous or biomass could be eroded from the media.

Sufficient oxygen must be available to satisfy the demand of the additional biomass and BOD oxidized. In many retrofitted plants, excess oxygen transfer capabilities exist and require little or no modifications. Data indicates that fixed media increases oxygen absorption efficiency by increasing bubble retention time. Nonetheless, maintaining conventionally established parameters provides a safety factor, unless site-specific oxygen transfer testing indicates otherwise.

The present invention, based on the above know-how, teaches certain benefits in construction and use which give rise to the objectives described below.

The present invention uses a beam supported at a balance point for pivotal reciprocating motion. The beam moves in cyclic tilting motion about the pivot such that its ends move vertically in mutually opposing directions. The ends of the beam pivotally engage vertical arms depending downwardly where each of the arms terminates at one or more mixing plates immersed in a mixing tank for the processing of biomass sludge. The mixing plates cause fluid mixing as the plates move within the sludge. The beam may be caused to dip first one end and then the other alternately by any one of several forcing drives. For instance an unbalancing weight may be moved from one side of the balance point to the other mechanically or hydraulically. Alternately, a buoyant force may be created by gas bubbles, or other hydraulic or mechanical means may be used to cause the tilting. A fixed film of biomass growth on the surfaces of the moving plates causes improved sludge breakdown efficiency as discussed above.

A primary objective of the present invention is to provide an apparatus and method of use of such apparatus that provides advantages not taught by the prior art.

A further primary objective of the present invention is to provide an improved sludge reduction process using IFAS techniques combined with paddle-type mixing where the paddles or plates are used for housing the biomass media as well as for moving the media through the effluent and causing improved aeration as well.

Another objective is to provide such an invention capable of causing significant mixing motion with low energy input, but using gravity and buoyancy to advantage.

A further objective is to provide such an invention capable of using the unbalancing of a beam as an advantageous way to mix a fluid.

A still further objective is to improve the efficiency of the process by providing a fixed film of biomass on the moving mixing plates.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate at least one of the best mode embodiments of the present invention. In such drawings.

DETAILED DESCRIPTION OF THE INVENTION

The above described drawing figures illustrate the present invention in at least one of its preferred, best mode embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

Figure 1:
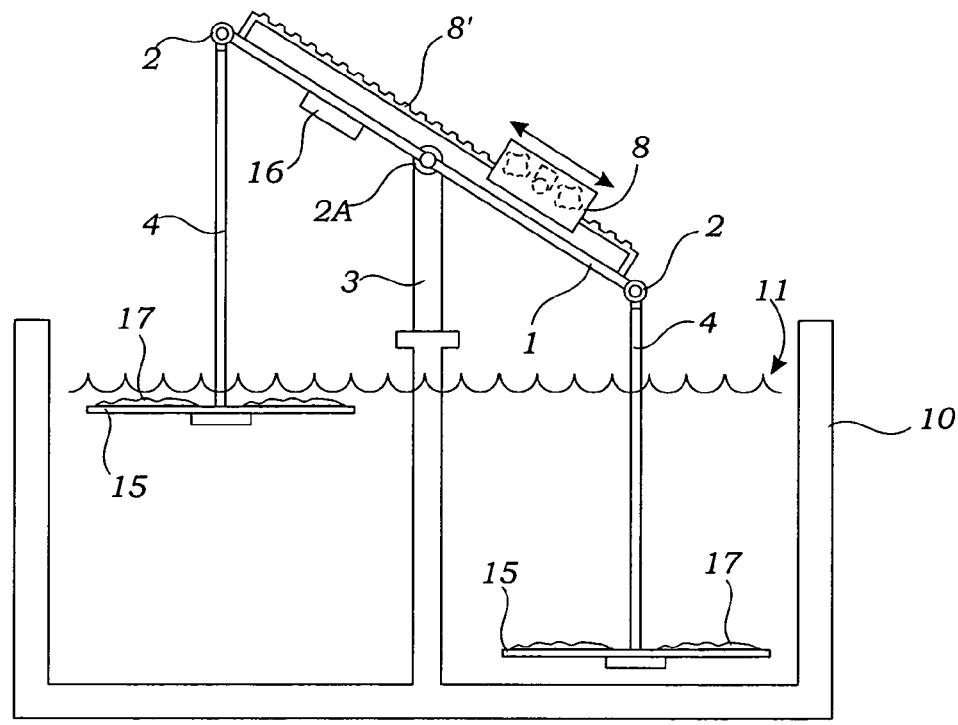
FIG. 1 is an elevational view of a first embodiment of the present invention, a mixer using a traveling weight to tip a balanced beam from one side to the other about a pivot point.

Generally, the present invention is an apparatus for mixing a fluid 11 within a tank 10. It is particularly applicable to the mixing of biomass sludge in wastewater or in a sewage treatment process. The tank 10 refers to one or more tanks of any size, but particularly to those used in municipal and industrial processes. In the figures we show two tanks separated by a wall, but the present invention is also able to be used effectively in a single larger tank. As shown in FIG. 1, the apparatus includes a beam 1 supported at a balance point on the beam, nominally at its axial center point, by a means for pivoting 2A which is attached to a fixed pivot support 3. The beam 1 is therefore movable in cyclic tilting motion about the pivoting means 2A such that the ends of the beam 1 move vertically in mutually opposing directions.

The ends of the beam 1 are pivotally engaged at pivots 2 by vertical arms 4 which depend downwardly therefrom. Each of the arms 4 terminate downwardly at one or more mixing plates of any alternative size, shape and type, and these are separately identified with numerals 13, 14 and 15 in the figures and will be described presently. The mixing plates are positioned, relative to the tank 10, so that they are immersed within the fluid 11 so that the mixing plates cause fluid mixing as the beam 1 tilts. A means for cyclically unbalancing the beam 1 to cause the tilting motion is provided and may be of several types as described below.

In one embodiment shown in FIG. 1, the unbalancing means comprises at least one weight 8 which is able to move along the beam 1 by any desired means so as to move the weight up hill to unbalance the beam 1 about the pivoting means 2A, thereby causing the cyclic tilting motion. In this embodiment, the beam 1 includes a linear gear 8'0 and the weight 8 is a trolley with an incorporated electric motor and cog wheels. The trolley receives electrical power which may be provided by a third rail system (not shown) as would be known by those of skill in the art, or by a power cord strung from the trolley to a source of power. The power may be provided by solar cells mounted on the trolley, or any other conventional and well known source. Alternately, the weight 8 may be a block having a desired and selected mass that is mounted on beam 1 so as to slide along the beam and may be drawn from one side of the beam 1 to the other side by a chain or belt. Those of skill will be able to move the weight along the beam in many alternative ways. A position sensitive switch 16 may be engaged with the beam 1 as well. Such a switch 16 may be a mercury switch or any other type of well known position sensitive device. This switch 16 may, in fact, be built into the trolley. The switch 16 and trolley cooperate to move the trolley along the beam 1 in accordance with the alternating motion. When the switch indicates that the beam 1 is in one of its two extreme positions, the trolley motor is reversed so that the trolley moves uphill and then does not reverse again until the trolley has reached the other of its two extreme positions wherein one of the mixing plates, which may be of the type shown as numeral 13, 14 or 15, is at its highest point and the other of the mixing plates is at its lowest point in tank 10.

Figure 2:
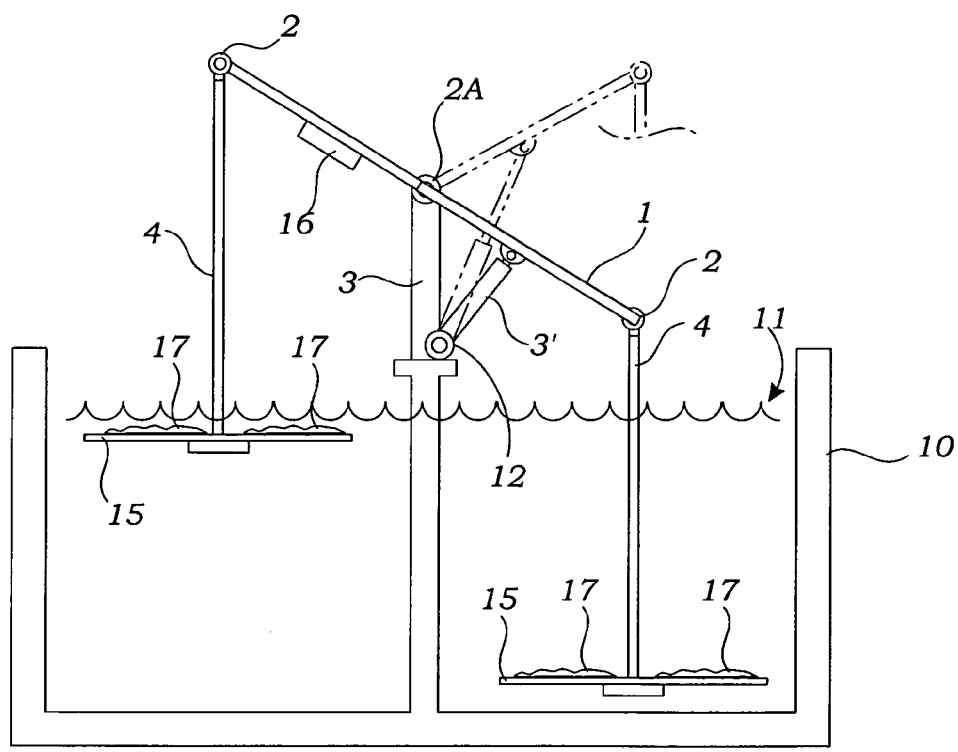
FIG. 2 is a further embodiment of the invention using a linear actuator to tip the balanced beam.

In a second embodiment of the invention, the unbalancing means comprises at least one linear actuator 3', such as a hydraulic or air cylinder. As shown in FIG. 2, the actuator 3' is pivotally engaged with the beam 1 in a manner whereby linear actuation causes the beam 1 to cyclically move in the tilting motion. Clearly it would be within the skill of one knowledgeable in this art to configure electrical and air or hydraulic lines in such manner as to enable the invention to perform this simple function. FIG. 2 shows the actuator 3' in solid line at is retracted position and also in phantom in its extended position.

In a third embodiment of the invention, shown in FIGS. 3 and 4, one or more diffuser pipes 9 deliver gas bubbles from below under the mixing plates that require buoyancy and the delivery of bubbles is alternated from side to side typically driving the lower mixing plates upward primarily by the buoyancy of gas delivered under the plates 13, 14, or 15. In this embodiment, the plates typically have a downward directed flange around them so that the gas is able to be captured and held below the plates, as for example plates 13 and 15, or the plates have a concave under surface to achieve the same result, as for example plates 14.

Figure 5:
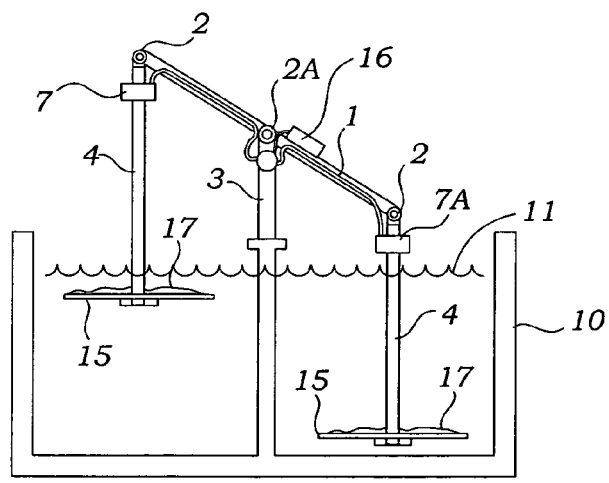
FIG. 5 is a yet further embodiment of the invention wherein a liquid is transferred to cause alternating weight unbalance to enable tipping of the beam.

In a fourth embodiment shown in FIG. 5, the unbalancing means comprises a pair of liquid reservoirs 7 and 7A, with one of the liquid reservoirs attached near each one of the ends of the beam 1. A liquid pump 5 is engaged with the pivot support 3. The reservoirs 7, 7A and the pump 5 are in mutual communication for moving the liquid, preferably water or other relatively heavy liquid, e.g., Mercury, cyclically from one of the reservoirs to the other of the reservoirs thereby causing the tilting motion of the beam 1 by means of its unbalancing. In this embodiment, switch 16 determines the direction of pump 5, so that when one side of the beam 1 is at it apogee, the pump 5 reverses the fluid flow and starts pumping the fluid to the reservoir 7 or 7A that is at it apogee. In fact, due to hysteresis effects, the reversal of pump 5 is started prior to the reservoir that is being filled reaching its low point. In this manner momentum of the beam 1, arms 4 and the mixing blades 15 is able to be overcome prior to the end of each cycle.

Figure 3:
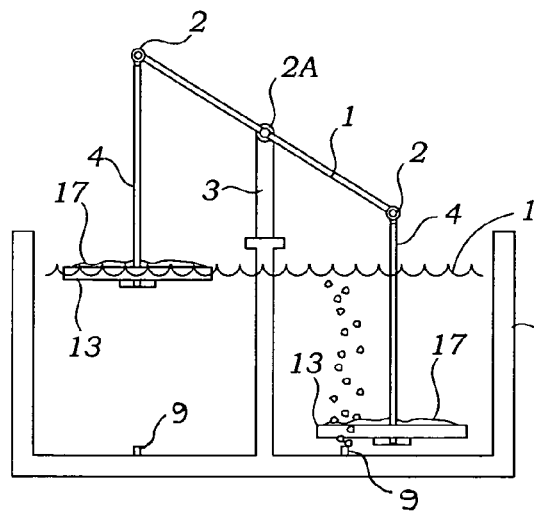
FIGS. 3 and 4 are still further embodiment of the invention wherein mixing blades of the invention are provided additional flotation using alternating bubble emission from below.
Figure 4:
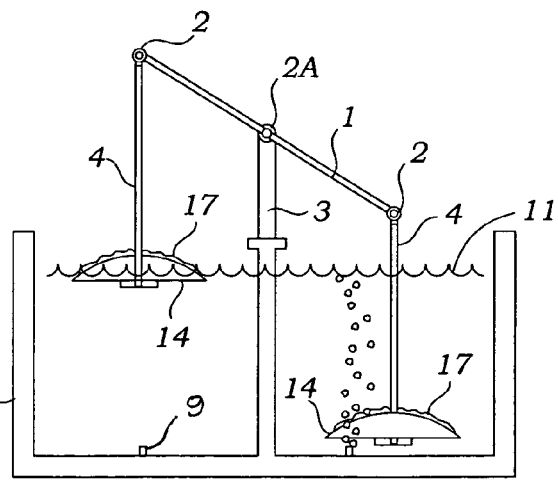

FIGS. 3 and 4 depict mixing blades 13 and 14 respectively. In both cases, these blades are constructed to be somewhat buoyant so that they less easily break away from the surface of the fluid 11. This provides a hesitation in the movement of beam 1 which may be sensed and cause reversal. Thus, in this manner, it is possible to sense the end of upward travel of the upwardly moving mixing blade and start the next cycle. Surface tension is also responsible for causing the mixing blade to halt or falter upon reaching the surface of the mixed medium. Preferably, the hesitation or faltering in the motion of the system is sensed using a momentum switch, i.e., a switch having a toggle with a mass attached, wherein a hesitation in motion causes the toggle to change state.

The method for mixing a fluid within a tank using the above described apparatus includes supporting the beam 1 at the balance point on the beam 1 by the means for pivoting 2A attached to the fixed pivot support 3, moving the beam 1 in tilting motion about the pivoting means 2A cyclically such that ends of the beam 1 move vertically in mutually opposing directions, pivotally engaging the ends of the beam with vertical arms 4 depending downwardly therefrom, terminating each of the arms downwardly with a mixing plate 13, 14 or 15, positioning the mixing plates for being immersed within the fluid 11 within the tank 10 so that the mixing plates cause fluid mixing as the beam 1 moves in the tilting motion and engaging the means for cyclically unbalancing the beam 1 to cause the tilting motion.

The method may include moving the weight 8 cyclically along the beam 1 from one side of the pivoting means 2A to the other side of the pivoting means thereby causing the tilting motion. Alternately, the motion may be caused by engaging the linear actuator 3' with the beam 1 in a manner whereby cyclic linear actuation causes the beam 1 to move in the tilting motion. Still further alternately, the pair of liquid reservoirs 7, 7A, one of the liquid reservoirs attached near each one of the ends of the beam 1 may be engaged with the liquid pump 5 in mutual fluid communication to cyclically move the liquid from one of the reservoirs to the other of the reservoirs thereby causing the tilting motion of the beam.

Figure 6:
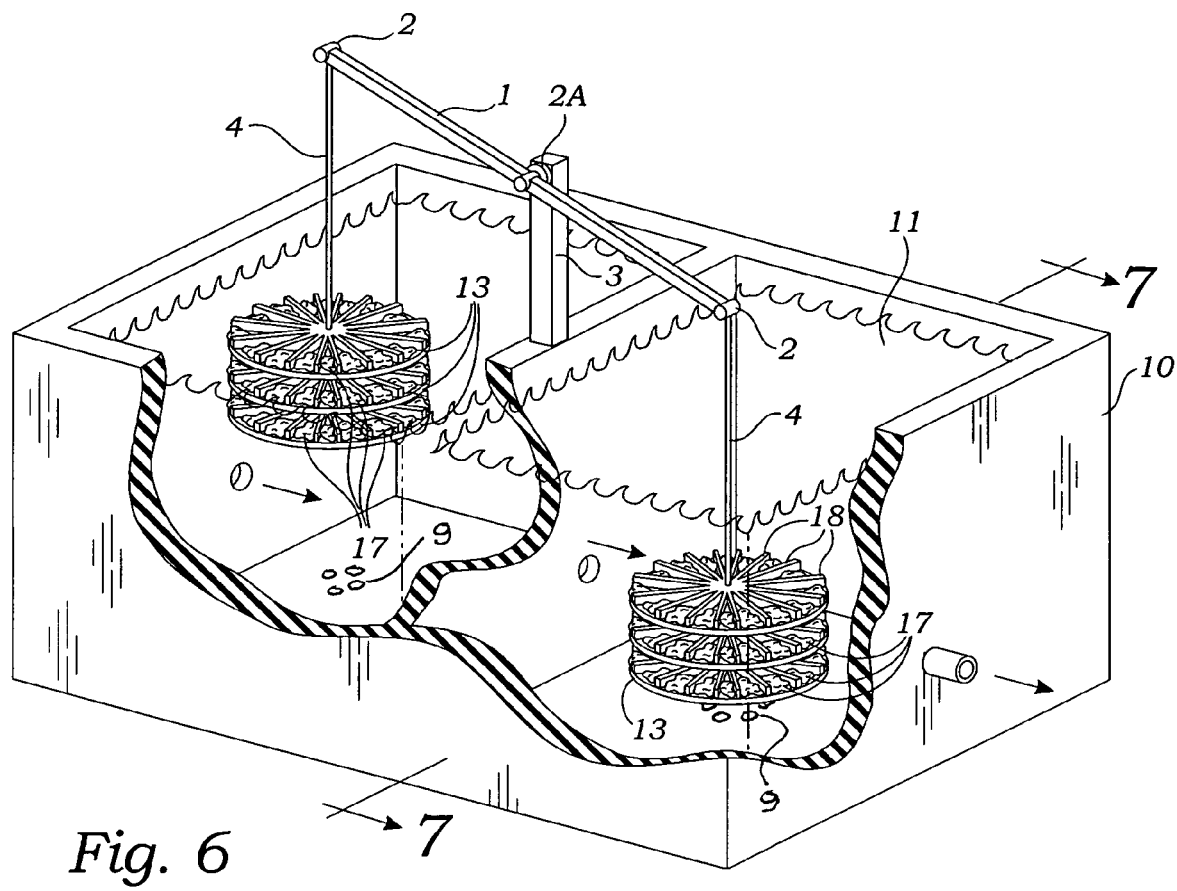
FIG. 6 is a perspective view of a mixer that may be made in accordance with any of the above enablements and further showing a stacked plate design with ridges formed on the plates and a fixed biomass engaged therebetween.
Figure 7:
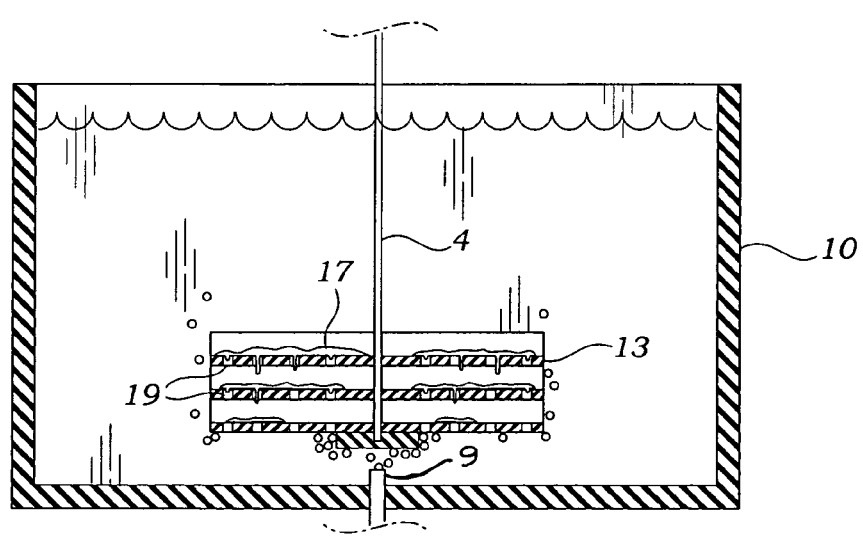
FIG. 7 is a vertical sectional view of the mixing assembly of FIG. 6 showing the apertures in the plates for enabling improved contact between the bio-media and the effluent.

This mixing systems described above are improved by applying a fixed film biomass 17 to the surfaces of the mixing plates 13, as shown in FIG. 6. The plates 13 (or 14 or 15) are adapted for this process by providing fins 18 which improves the adherence of the fixed films 17 to the plates 13. In FIG. 6 we see that the wastewater flows from left, in the figure, to right so as to move from tank to tank as shown by the arrows. The process is thus a flow-through type of continuous process. The mixing plates 13 not only provide physical agitation of the fluids within the tanks 10, but with the fixed film biomass 17 engaged on the plates 13, the fluids are flushed through the biomass and are therefore further processed. Preferably, the plates 13 contain apertures or 19 in them so that, as they rise, the sludge is forced from plate 13 to plate 13 and comes into contact with as much fixed film biomass 17 as possible for maximal processing efficiency in reduction of the sludge.

The enablements described in detail above are considered novel over the prior art of record and are considered critical to the operation of at least one aspect of one best mode embodiment of the instant invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of the embodiments of the herein described invention and its related embodiments not described are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. An apparatus for mixing a fluid within a tank, the apparatus comprising: a beam pivotally supported at a fixed pivot support, the beam movable in cyclic tilting motion such that ends of the beam move vertically in mutually opposing directions; the ends of the beam pivotally engaging vertical elongate arms depending downwardly therefrom, the elongate arms executing primarily vertical motion; each elongate arm downwardly terminating and engaged with a plurality of vertically spaced-apart mixing plates oriented orthogonally to the elongate arm and orthogonally to the motion of the elongate arm, each of the mixing plates providing radially oriented fins; the mixing plates immersed within the fluid and providing apertures therein for conducting the fluid between the plates so that the mixing plates cause fluid mixing as the beam moves in the tilting motion; a means for causing the beam to execute cyclic tilting motion; and a fixed film biomass engaging the plurality of plates for biologically processing the fluid in the tank, wherein the unbalancing means is a weight moving cyclically along the beam from one side of the pivoting means to another side of the pivoting means thereby causing the tilting motion.

2. The apparatus of claim 1 wherein the unbalancing means further includes at least one diffuser pipe positioned below each of the plates for delivering gas bubbles thereto in an alternating manner for buoying first one of the plates and then the other one of the plates alternately.

3. The apparatus of claim 1 wherein the mixing blades are buoyant.

4. A method for mixing a fluid within a tank, the method comprising the steps of: supporting a beam at a balance point on the beam; moving the beam in tilting motion about the balance point such that ends of the beam move vertically in mutually opposing directions; pivotally engaging the ends of the beam with vertical arms depending downwardly therefrom; terminating each of the arms downwardly with a plurality of mixing plates, each of the mixing plates providing apertures and radially oriented fins; positioning the mixing plates for being immersed within the fluid in the tank so that the mixing plates cause fluid mixing as the beam moves in the tilting motion; engaging a means for cyclically unbalancing the beam to cause the tilting motion; and engaging a fixed film biomass on the surfaces of the plates for improved bio-processing of the fluid, and forming the unbalancing means as a weight moving cyclically along the beam from one side of the pivoting means to another side of the pivoting means thereby causing the tilting motion.

5. The method of claim 4 further comprising the step of positioning a gas emitter below each of the plates; delivering gas bubbles under one of the plates alternately with the delivery of gas bubbles below the other of the plates.

* * * * *